Figure 1:
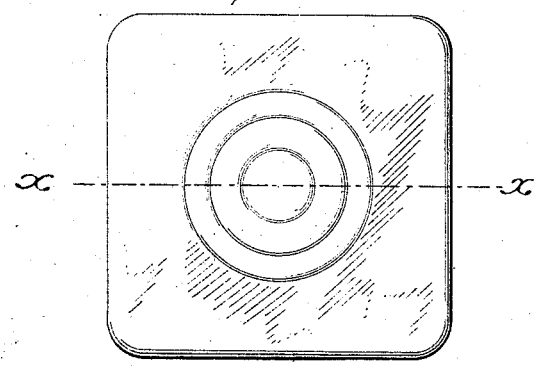

No. 785,234. PATENTED MAR. 21, 1905.
W. R. SINE.
MANUFACTURE OF ARTICLES FROM HARD RUBBER.
APPLICATION FILED APR. 16, 1903.

Attest:
C. S. Middleton
Edward Sarton

Inventor
William R. Sine.
By His Spear Company
Attys

No. 785,234.

Patented March 21, 1905.

UNITED STATES PATENT OFFICE.

WILLIAM R. SINE, OF WILLIAMSPORT, PENNSYLVANIA.

MANUFACTURE OF ARTICLES FROM HARD RUBBER.

SPECIFICATION forming part of Letters Patent No. 785,234, dated March 21, 1905.

Application filed April 16, 1903. Serial No. 152,972.

*To all whom it may concern:*

Be it known that I, WILLIAM R. SINE, a citizen of the United States, residing at Williamsport, Lycoming county, State of Pennsylvania, have invented certain new and useful Improvements in the Manufacture of Articles from Hard Rubber, of which the following is a specification.

The advantages of hard rubber are very well known; but its use has been very much restricted, first, because of its expense, and, secondly, due to its lack of strength, as its brittle nature has prohibited its use in many situations where the character of the material would make it ideal, except that it lacked strength and is liable to crack or break by reason of its brittle nature.

My invention is designed to make possible the use of hard rubber by first reducing its cost in the manufactured article, this being accomplished by combining with it a much cheaper material, and, as a second object, to increase its durability and take from it its brittle nature by the use of the cheaper material referred to, which not only reduces the cost, requiring the use of less rubber by reason of the material substituted therefor, but materially increases the durability of the manufactured product and renders it capable of use where prior to my invention hard rubber had never been used and could not be used for the reasons stated above.

In carrying out my invention I utilize a fabric body which is saturated or filled with a preparation of hard-rubber compound, the fabric filling being practically embedded in the hard rubber, which completely covers and conceals the fabric and presents externally a hard-rubber surface capable of being ornamented or polished according to the requirements of the particular article which is to be manufactured out of this material. I have estimated that a pound of the fabric will take the place of a pound and a half of the rubber compound as compared with an article made wholly of rubber, which means a very great saving in cost, and in addition to this the fabric interior in substitution of the amount of rubber displaced by it makes the article very much lighter and increases its durability and strength to such an extent as to enable it to be used where it is not possible to use hard rubber alone and where its cost is so expensive as to practically prohibit its use and yet where the characteristics of the material make its use imperative or at least exceedingly desirable.

In the accompanying drawings I have illustrated the invention as applied to the production of a winker for the bridle of a horse-harness.

Figure 2:

Figure 1 shows the plan view of the article, and Fig. 2 a section on line $x$ $x$ of Fig. 1.

It will be understood that I do not limit myself to any particular article, as the material may be utilized for many classes of articles, in some to cheapen the production where the present cost is high, due to the cost of the hard-rubber compound, and to extend its use to the manufacture of other classes of articles where the hard-rubber compound could not be used alone, because of its lack of strength. To enumerate, I may mention that in the manufacture of winker-blinds my improved material will enable me to produce a stronger article, one free from the objectionable stitching necessary in leather blinds, and by reason of the rigid nature of the material there is no liability to the bending of the corners so common in leather blinds. I can also make a lighter and yet stronger blind and reduce the cost more than fifty per cent., while materially increasing the durability and therefore the life of the blind. The material may also be used in the manufacture of dashboards for buggies, and it has the advantage over patent-leather of greater durability, less liability to be defaced, and it can be made for fifty per cent. less than the cheapest leather.

My improved material may be used in the manufacture of medallions and rosettes for harness at one-half the expense of those now made of leather, and they are practically indestructible.

Vessels for marketing hydrofluoric acid are now made of sealing-wax for the reason that while hard rubber is very much more desirable its cost makes it prohibitive and it is lacking in the necessary strength. By my improvement I overcome the objection both as to cost and weakness and can make the vessel of any size, the material being free from the limitations as to size due to the present use of sealing-wax.

The addition of the textile fabric adds very greatly to the strength of the material, as I have found by actual practice, and even after severe blows tending to fracture the outer skin or surface I have found the material to be impervious to water, and thus to be highly desirable for use in such articles as developing-dishes for photographers' use, as a slight crack or fracture will not allow the liquid contents of the dish to be drained away.

My invention is especially desirable in certain classes of surgical devices where hard rubber would be exceedingly desirable, but cannot be used because of its brittle nature, rendering it liable to break off in use, as in case of catheters or dilators, which are now made by an elaborate process with shellac and fabric, while with my improved material the process of manufacture is simpler and shorter, the cost not to exceed one-half of the present expense of manufacture and, further, presents a material much more desirable and better fitted for this particular use.

In carrying out my invention I take the fabric which is adapted to form the interior of the article and saturate or fill the interstices with the rubber compound, accomplishing this preferably by friction-calendering—that is, by passing the fabric between steam-heated rolls—applying the rubber compound to the surface, and this is forced through by the pressure applied by the rolls, the compound being thinned or softened temporarily by the heat. The fabric thus filled is cut into the proper shape required by the particular article desired, and while in some instances one layer is sufficient in many cases—as, for instance, in the manufacture of blinders for harness—I sometimes take three sheets of the filled fabric and place them one upon the other. I then apply to the filled fabric on each side a veneer of rubber, or what is properly termed a "skim coating" of rubber. The filled-fabric center with its outer coating of rubber compound is then placed in a mold and pressure applied for the purpose, first, of uniting in a homogeneous mass the skim or outer coating with the rubber filling and, secondly, giving the article the proper shape, and then the molded article is vulcanized. This gives an article not composed of layers of fabric and rubber, but composed of a fabric interior filled in all its interstices with the compound and having an outer coating of rubber integral with and bound together by the filling and the filaments comprising the same, which pass through from side to side of the fabric, so that there is no possibility for separation into sheets, as would be the case in a layer formation without saturation or filling.

I do not, of course, limit myself to the precise method stated; but it is essential to my invention that the fabric be filled or saturated with the rubber compound.

What I claim is—

As a new article of manufacture, a material having a fabric interior saturated and covered with a hard vulcanized compound of india-rubber and sulfur, substantially as described.

In testimony whereof I affix my signature in presence of two witnesses.

WILLIAM R. SINE.

Witnesses:
HENRY E. COOPER,
L. B. MIDDLETON.